United States Patent [19]

Jäger et al.

[11] Patent Number: 5,057,609
[45] Date of Patent: Oct. 15, 1991

[54] TRIPHENDIOXAZINE DYESTUFFS

[75] Inventors: Horst Jäger, Leverkusen; Joachim Wolff, Odenthal, both of Fed. Rep. of Germany

[73] Assignee: Bayer Aktiengesellschaft, Leverkusen, Fed. Rep. of Germany

[21] Appl. No.: 369,441

[22] Filed: Jun. 20, 1989

[30] Foreign Application Priority Data

Jul. 6, 1988 [DE] Fed. Rep. of Germany ....... 3822850

[51] Int. Cl.$^5$ ............................................ C07D 498/02
[52] U.S. Cl. ........................................ 544/75; 544/76; 544/77
[58] Field of Search .............................. 544/75, 76, 77

[56] References Cited

U.S. PATENT DOCUMENTS 4,621,138 11/1986 Jäger et al. ............................ 544/76
4,785,099 11/1988 Springer et al. ...................... 544/76
4,851,527 7/1989 Springer et al. ...................... 544/75

Primary Examiner—C. Warren Ivy
Assistant Examiner—Celia Chang
Attorney, Agent, or Firm—Sprung Horn Kramer & Woods

[57] ABSTRACT

Dyestuffs of the formula

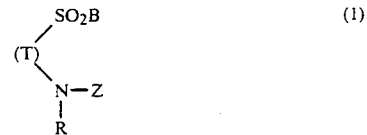

in which the substituents have the meanings given in the description are suitable for the dyeing and printing of hydroxy-containing and amido-containing materials. They produce blue dyeings having high color density and high light fastness and wet fastness properties.

7 Claims, No Drawings

TRIPHENDIOXAZINE DYESTUFFS

The present invention relates to new triphendioxazine dyestuffs of the formula

in which
T is the radical of a triphendioxazine dyestuff which is free of —SO$_2$and

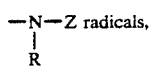 radicals,

B is CH=CH$_2$ or CH$_2$CH$_2$V, in which V is a detachable group such as OSO$_3$H, Cl, S$_2$O$_3$H, OCOCH$_3$, OPO$_3$H$_2$, —$^\oplus$N(CH$_3$)$_3$
R is H or substituted or unsubstituted C$_1$-C$_4$-alkyl,
Z is a fibre-reactive radical.

The radical SO$_2$B is preferably directly bonded to an aromatic-carbocyclic ring of T.

The radical

can be bonded directly or via a bridge member to an aromatic-carbocyclic ring of T.

The application in particular relates to new triphendioxazine dyestuffs of the formula

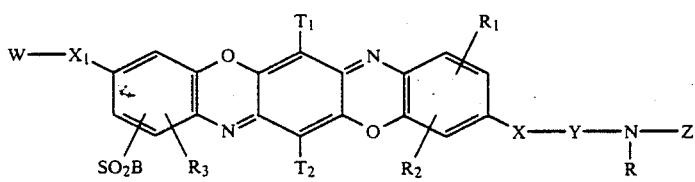 (2)

in which
B, R and Z have the abovementioned meaning,
T$_1$ and T$_2$ represent H, Cl, Br, C$_1$-C$_4$-alkoxy, C$_1$-C$_4$-alkyl, substituted or unsubstituted phenyl or phenoxy, in which T$_1$ and T$_2$ preferably have the same meaning,
X and X$_1$ represent O,

R" represents hydrogen or substituted or unsubstituted C$_1$-C$_4$-alkyl and, if Y denotes a substituted or unsubstituted divalent aliphatic radical, together with R also represents alkylene, preferably —CH$_2$CH$_2$—, and, if W denotes an aliphatic radical, together with W optionally with the inclusion of a heteroatom can form a ring,
Y represents an optionally further substituted divalent aliphatic, araliphatic, cycloaliphatic or aromatic radical,
W represents H or an optionally further substituted aliphatic, araliphatic, cycloaliphatic or aromatic radical,
R$_1$ is a water-solubilizing group, such as a carboxyl or sulpho group, or is a sulphomoyl group which can be monosubstituted or disubstituted, the substituents preferably being alkyl groups having 1 to 4 C atoms, which can be substituted by a phenyl radical, and are phenyl radicals, where these radicals in turn can preferably contain water-solubilizing groups, or is a disulphimido group SO$_2$NHSO$_2$R$_4$, where R$_4$ represents a substituted or unsubstituted C$_1$-C$_4$-alkyl radical or a phenyl radical, or is a sulphone group —SO$_2$R$_4$.
R$_2$ and R$_3$ represent H, C$_1$-C$_4$-alkyl, C$_1$-C$_4$alkoxy, carboxyl, F, Cl or Br.

The radicals SO$_2$B and R$_1$ are each in the o-position relative to the substituent X$_1$W or

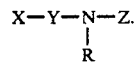

Suitable substituents for R as substituted or unsubstituted C$_1$-C$_4$-alkyl are preferably: OH, OCH$_3$, COOH, SO$_3$H, OSO$_3$H.

Examples of R are: CH$_3$, C$_2$H$_5$, n-C$_3$H$_7$, n-C$_4$H$_9$, which can be substituted by OH, OCH$_3$, COOH, SO$_3$H or OSO$_3$H. Substituents of the substituted or unsubstituted phenyl and phenoxy radicals T$_1$ and T$_2$ are, for example, Cl, CH$_3$, C$_2$H$_5$, OCH$_3$ and OC$_2$H$_5$.

If they are further substituted, the radicals Y preferably carry the following further substituents: SO$_3$H, OSO$_3$H, COOH, CH$_3$, OCH$_3$, substituted or unsubstituted phenyl. Moreover, the araliphatic, aliphatic or cycloaliphatic radicals Y can be interrupted by heteroatoms or heteroatom groups or by the phenyl grouping. Examples are: O, S, NH, N(COCH$_3$).

a) Examples of aromatic radicals Y are as follows:

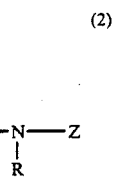

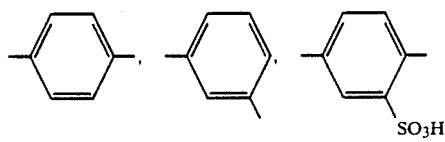

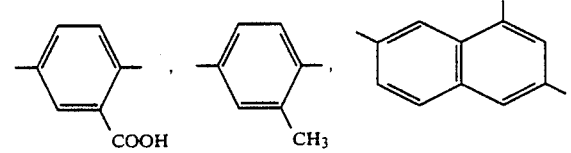

b) Examples of araliphatic radicals Y are as follows:

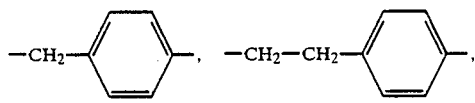

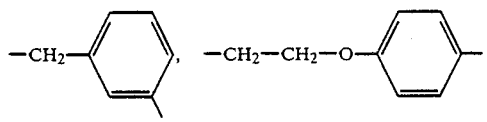

c) Examples of aliphatic or cycloaliphatic radicals Y are as follows:

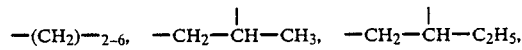

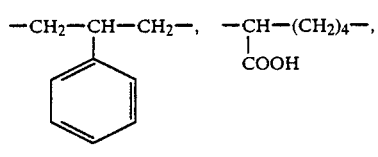

—CH$_2$—CH$_2$—O—CH$_2$—CH$_2$—,

—CH$_2$—CH$_2$—S—CH$_2$—CH$_2$—,

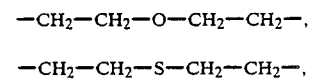

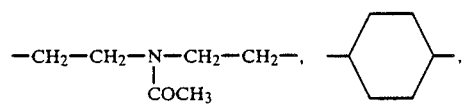

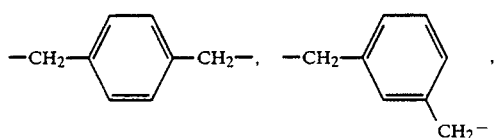

A suitable radical $$-X-Y-\underset{\underset{R}{|}}{N}$$

is in particular also

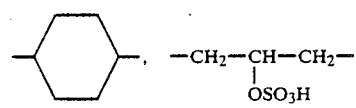

If they are further substituted, the radicals W preferably carry the following substituents: SO$_3$H, OSO$_3$H, COOH, CH$_3$, OCH$_3$, CL. Furthermore, the aliphatic, araliphatic or cycloaliphatic radicals W can be interrupted by heteroatoms or heteroatom groups. Examples are: O, S, NH.

a) Examples of aromatic radicals W are as follows:

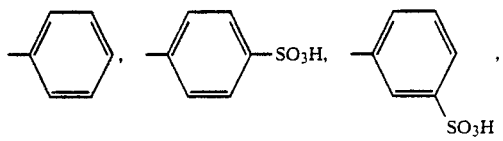

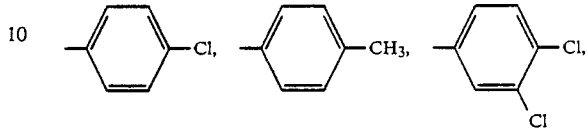

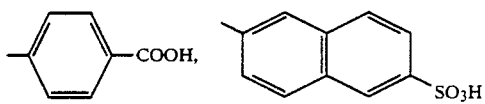

b) Examples of araliphatic radicals W are as follows:

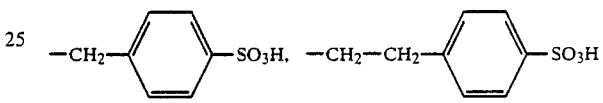

c) Examples of aliphatic or cycloaliphatic radicals W are as follows:
—CH$_3$, —C$_2$H$_5$, —CH$_2$—CH$_2$—OSO$_3$H, —CH$_2$—CH$_2$—SO$_3$H,
—CH$_2$—CH$_2$—O—CH$_2$—OSO$_3$H, —CH$_2$—COOH, —(CH$_2$)$_2$—NHCO—(CH$_2$)$_2$—COOH,
—CH$_2$—CH$_2$—CH$_2$—CH$_2$—OSO$_3$H, —CH$_2$—CH$_2$—CH$_2$—CH$_2$—SO$_3$H,

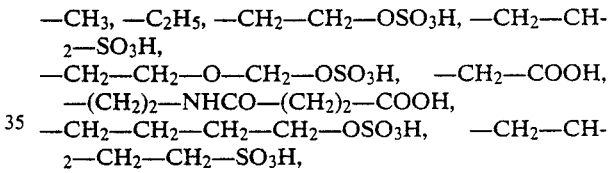

Suitable radicals W-X$_1$- are in particular also

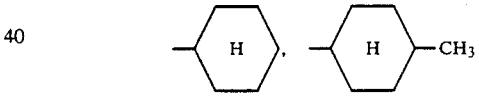

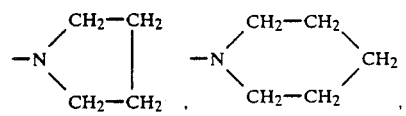

Suitable radicals R$_4$ are, for example:

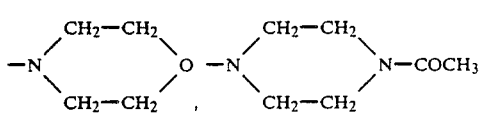

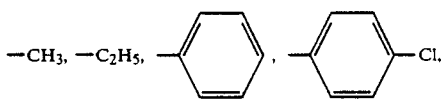

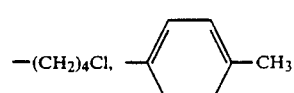

Suitable fibre-reactive radicals Z, that is, those which react with the OH or NH groups of the fibre under dyeing conditions with the formation of covalent bond, are in particular those which contain at least one reactive substituent bound to a 5- or 6-membered aromatic-heterocyclic ring, for example to a monoazine, diazine or triazine ring, in particular a pyridine, pyrimidine, pyridazine, pyrazine, thiazine, oxazine or an unsymmetrical or symmetrical triazine ring, or to that type of ring system containing one or more fused-on aromatic-carbocyclic rings, for example a quinoline, phthalazine, cinnoline, quinazoline, quinoxaline, acridine, phenazine and phenanthridine ring system.

Examples of suitable reactive substituents on the heterocycle are halogen (Cl, Br or F), ammonium including hydrazinium, pyridinium, picolinium, carboxypyridinium, sulphonium, sulphonyl, azido (N), thiocyanato, mercapto ether, hydroxy ether, sulphinic acid and sulphonic acid.

Individual examples are:

2,4-difluoro-6-triazinyl,2,4-dichloro-6-triazinyl,-monohalo-sym.-triazinyl radicals, in particular monochloro-and monofluorotriazinyl radicals which are substituted by alkyl, aryl, amino, monoalkylamino, dialkylamino, aralkylamino, arylamino, morpholino, piperidino, pyrrolidino, piperazino, alkoxy, aryloxy, alkylthio, arylthio, where alkyl is preferably substituted or unsubstituted $C_1$-$C_4$-alkyl, aralkyl is preferably substituted or unsubstituted phenyl-$C_1$-$C_4$-alkyl and aryl is preferably substituted or unsubstituted phenyl or naphthyl and where preferred substituents for alkyl are halogen, hydroxyl, cyano, vinylsulphonyl, substituted alkylsulphonyl, dialkylamino, morpholino, $C_1$-$C_4$-alkoxy, vinylsulphonyl-$C_2$-$C_4$-alkoxy, substituted alkylsulphonyl-$C_2$-$C_4$-alkoxy, carboxyl, sulpho or sulphato and preferred substituents for phenyl and naphthyl are sulpho, $C_1$-$C_4$-alkyl, $C_1$-$C_4$-alkoxy, carboxyl, halogen, acylamino, vinylsulphonyl, substituted alkylsulphonyl, hydroxyl, amino.

Individual radicals are as follows:

2-Amino-4-fluoro-6-triazinyl, 2-methylamino-4-fluoro-6-triazinyl, 2-ethylamino-4-fluoro-6-triazinyl, 2-isopropylamino-4-fluoro-6-triazinyl, 2-dimethylamino-4-fluoro-6-triazinyl, 2-diethylamino-4-fluoro-6-triazinyl, 2-$\beta$-methoxyethylamino-4-fluoro-6-triazinyl, 2-$\beta$-hydroxyethylamino-4-fluoro-6-triazinyl, 2-di-($\beta$-hydroxyethylamino)-4-fluoro-6-triazinyl, 2-$\beta$-sulfoethylamino-4-fluoro-6-triazinyl, 2-$\beta$-sulphoethylmethylamino-4-fluoro-6-triazinyl, 2-carboxymethylamino-4-fluoro-6-triazinyl, 2-di-(carboxymethylamino)-4-fluoro-6-triazinyl, 2-sulphomethylmethylamino-4-fluoro-6-triazinyl, 2-$\beta$-cyanoethylamino-4-fluoro-6-triazinyl, 2-benzylamino-4-fluoro-6-triazinyl, 2-$\beta$-phenylethylamino-4-fluoro-6-triazinyl, 2-benzylmethylamino-4-fluoro-6-triazinyl, 2-(4'-sulphobenzyl)-amino-4-fluoro-6-triazinyl, 2-cyclohexylamino-4-fluoro-6-triazinyl, 2-(o-, m-, p-methylphenyl)-amino-4-fluoro-6-triazinyl, 2-(o-, m-, p-sulphophenyl)-amino-4-fluoro-6-triazinyl, 2-(2',5'-disulphophenyl)-amino-4-fluoro-6-triazinyl, 2-(o-, m-, p-chlorophenyl)-amino-4-fluoro-6-triazinyl, 2-(o-, m-, p-methoxyphenyl)-amino-4-fluoro-6-triazinyl, 2-(2'-methyl-4'-sulphophenyl)-amino-4-fluoro-6-triazinyl, 2-(2'-methyl-5'-sulphophenyl)amino-4-fluoro-6-triazinyl, 2-(2'-chloro-4'-sulphophenyl)-amino-4-fluoro-6-triazinyl, 2-(2'-methoxy-4'-sulphophenyl)-amino-4-fluoro-6-triazinyl, 2-(o-, m-, p-carboxyphenyl)-amino-4-fluoro-6-triazinyl, 2-(2',4'-disulphophenyl)-amino-4-fluoro-6-triazinyl, 2-(3'-5'-disulphophenyl)-amino-4-fluoro-6-triazinyl, 2-(2'-carboxy-4'-sulphophenyl)-amino-4-fluoro-6-triazinyl, 2-(2'-carboxy-5'-sulphophenyl)-amino-4-fluoro-6-triazinyl, 2-(6'-sulphonaphthyl-(2'))-amino-4-fluoro-6-triazinyl, 2-(4',8'-disulphonaphthyl-(2'))-amino-4-fluoro-6-triazinyl, 2-(6',8'-disulpho-2'-naphthyl)-amino-4-fluoro-6-triazinyl, 2-(N-methyl-N-phenyl)-amino-4-fluoro-6-triazinyl, 2-(N-ethyl-N-phenyl)-amino-4-fluoro-6-triazinyl, 2-(N-$\beta$-hydroxyethyl-N-phenyl)-amino-4-fluoro-6-triazinyl, 2-(N-iso-propyl-N-phenyl)-amino-4-fluoro-6-triazinyl, 2-morpholino-4-fluoro-6-triazinyl, 2-piperidino-4-fluoro-6-triazinyl, 2-(4',6',8'-trisulphonaphthyl-(2'))-amino-4-fluoro-6-triazinyl, 2-(3',6',8'-trisulpho-2'-naphthyl)amino-4-fluoro-6-triazinyl, 2-(3',6'-disulpho-1-naphthyl)-amino-4-fluoro-6-triazinyl, N-methyl-N-(2,4-dichloro-6-triazinyl)-carbamyl, N-methyl-N-(2-methylamino-4-chloro-6-triazinyl)-carbamyl, N-methyl-N-(2-dimethylamino-4-chloro-6-triazinyl)-carbamyl, N-methyl- and N-ethyl-N-(2,4-dichloro-6-triazinyl)-aminoacetyl, 2-methoxy-4-fluoro-6-triazinyl, 2-ethoxy-4-fluoro-6-triazinyl, 2-phenoxy-4-fluoro-6-triazinyl, 2-(o-, m- or p-sulphophenoxy)-4-fluoro-6-triazinyl, 2-(o-, m- or p-methyl or - methoxyphenoxy)-4-fluoro-6-triazinyl, 2-$\beta$-hydroxyethylmercapto-4-fluoro-6-triazinyl, 2-phenylmsrcapto-4-fluoro-6-triazinyl, 2-(4'-methylphenyl)-mercapto-4-fluoro-6-triazinyl, 2-(2',4'-dinitrophenyl)-mercapto-4-fluoro-6-triazinyl, 2-methyl-4-fluoro-6-triazinyl, 2-phenyl-4-fluoro-6-triazinyl and also the corresponding 4-chlorotriazinyl and 4-bromotriazinyl radicals and the corresponding radicals obtainable by halogen exchange with tertiary amines such as trimethylamine, triethylamine, diethyl-$\beta$-hydroxyethylamine, triethanolamine, N,N-dimethylhydrazine, pyridine, $\alpha$-, $\beta$- or $\gamma$-picoline, nicotinic acid or isonicotinic acid, sulphinates, in particular benzenesulphonic acid or bisulphite.

The halogenotriazinyl radicals can also be linked to a second halogenotriazinyl radical or a halogenodiazinyl radical or one or more vinylsulphonyl or sulphatoethylsulphonyl radicals, for example via a bridge member

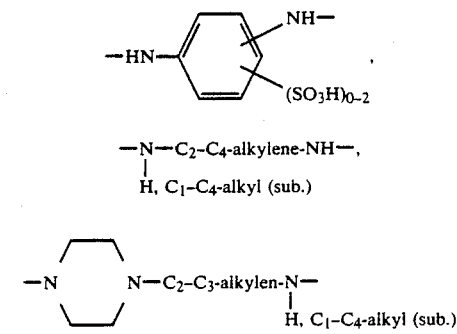

or in the case of the sulphatoethylsulphonyl or vinylsulphonyl group via a bridge member

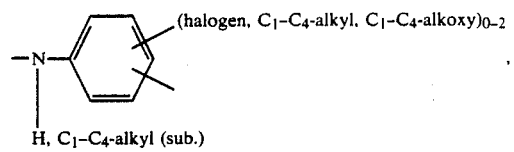

-continued

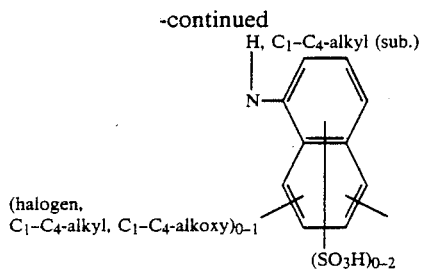

(halogen,
$C_1$–$C_4$-alkyl, $C_1$–$C_4$-alkoxy)$_{0-1}$
H, $C_1$–$C_4$-alkyl (sub.)
($SO_3H$)$_{0-2}$ Mono-, di- or trihalopyrimidinyl radicals, such as 2,4-dichloro-6-pyrimidinyl, 2,4,5-trichloro-6-pyrimidinyl, 2,4-dichloro-5-nitro- or -5-methyl- or -5-carboxymethyl-or -5-carboxy- or -5-cyano- or -5-vinyl- or -5-sulpho-or -5-mono-, -di- or -trichloromethyl- or -5-carbalkoxy-6-pyrimidinyl, 2,6-dichloropyrimidine-4-carbonyl, 2,4-dichloropyrimidine-5-carbonyl, 2-chloro-4-methylpyrimidine-5-carbonyl,2-methyl-4-chloropyrimidine-5-carbonyl,2-methylthio-4-fluoropyrimidine-5-carbonyl, 6-methyl-2,4-dichloropyrimidine-5-carbonyl, 2,4,6-trichloropyrimidine-5-carbonyl,2,4-dichloropyrimidine-5-sulphonyl,2-chloroquinoxaline-3-carbonyl, 2- or 3-monochloroquinoxaline-6-sulphonyl, 2,3-dichloroquinoxaline-5- or -6-carbonyl, 2,3-dichloro- quinoxaline-5- or -6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4′,5′-dichloropyridazon-6-yl-1′)-phenylsulphonyl or -carbonyl, β-(4′,5′-dichloropyridazon-6′-yl-1′)-ethylcarbonyl, N-methyl-N-(2,3-dichloroquinoxaline-6-sulphonyl)-aminoacetyl, N-methyl-N-(2,3-dichloroquinoxaline-6-carbonyl)-aminoacetyl and the corresponding bromine and fluorine derivatives of the abovementioned chlorine-substituted heterocyclic radicals, of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl,2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl- 4-pyrimidinyl,2-fluoro-5-chloropyrimidin-4-yl,2-methyl-4-fluoro-5-methylsulphonylpyrimidin-6-yl, 2,6-difluoro-5-methylsulphonyl-4-pyrimidinyl, 2,6-dichloro-5-methylsulphonyl-4-pyrimidinyl, 2-fluoro-5-sulphonamido-4-pyrimidinyl, 2,6-fluoro-5-chloro-6-carbomethoxy-4-pyrimidinyl, 2,6-difluoro-5-trifluoromethyl-4-pyrimidinyl; sulphonyl-containing triazine radicals, such as 2,4-bis-(phenylsulphonyl)-6-triazinyl, 2-(3′-carboxyphenyl)sulphonyl-4-chloro-6-triazinyl, 2-(3′-sulphophenyl)-sulphonyl-4-chloro-6-triazinyl, 2,4-bis-(3′-carboxyphenylsulphonyl)-6-triazinyl;sulphonyl-containing pyrimidine rings, such as 2-carbox-ymethylsulphonyl-4-pyrimidinyl, 2-methylsulphonyl-6-methyl-4-pyrrmidinyl, 2-methylsulphonyl-6-ethyl-4-pyrimidinyl, 2-phenylsulphonyl-5-chloro-6-methyl-4-pyrimidinyl, 2,6-bis-methylsulphonyl-4-pyrimidinyl, 2,6-bis-methylsulphonyl-5-chloro-4-pyrimidinyl, 2,4-bis-methylsulphonyl-pyrimidine-5-sulphonyl, 2-methylsulphonyl-4-pyrimidinyl, 2-phenylsulphonyl-4-pyrimidinyl, 2-trichloromethylsulphonyl-6-methyl-4-pyrrmidinyl, 2-methylsulphonyl-5-chloro-6-methyl-4-pyrrmidinyl, 2-methylsulphonyl-5-bromo-6-methyl-4-pyrimidinyl, 2-methylsulphonyl-5-chloro-6-ethyl-4-pyrimidinyl, 2-methylsulphonyl-5-chloro-6-chloromethyl-4-pyrimidinyl, 2-methylsulphonyl-4-chloro-6-methylpyrimidine-5-sulphonyl, 2-methylsulphonyl-5-nitro-6-methyl-4-pyrimidinyl, 2,5,6-tris-methylsulphonyl-4-pyrimidinyl, 2-methylsulphonyl-5,6-dimethyl-4-pyrimidinyl, 2-ethylsulphonyl-5-chloro-6-methyl-4-pyrimidinyl, 2-methylsulphoyl-6-chloro-4-pyrimidinyl, 2,6-bis-methylsulphonyl-5-chloro-4-pyrimidinyl, 2-methylsulphonyl-6-carboxy-4-pyrimidinyl, 2-methylsulphonyl-5-sulpho-4-pyrimidinyl, 2-methylsulphony-6-carbomethoxy-4-pyrimidinyl, 2-methylsulphonyl-5-carboxy-4-pyrimidinyl, 2-methylsulphonyl-5-cyano-6-methoxy-4- pyrimidinyl, 2-methylsulphonyl-5-chloro-4-pyrimidinyl,2-β-sulphoethylsulphonyl-6-methyl-4-pyrimidinyl, 2-methylsulphonyl-5-chloro-4-pyrimidinyl, 2-carboxymethylsulphonyl-5-chloro-6-methyl-4-pyrimidinyl, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl; 2-chlorobenzothiazole-5- or -6-carbonyl or -5- or -6- sulphonyl, 2-arylsulphonyl or alkylsulphonylbenzothiazole-5- or -6-carbonyl- or -5- or -6-sulphonyl, such as 2-methylsulphonyl- or 2-ethylsulphonylbenzothiazole-5- or -6- sulphonyl- or -carbonyl, 2-phenylsulphonylbenzothiazole-5- or -6-sulphonyl or carbonyl and the corresponding derivatives containing sulpho groups in the fused-on benzene ring, such as 2-sulphonylbenzothiazole -5- or -6-carbonyl or -sulphonyl derivatives, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl, N-oxide of 4-chloro- or 4-nitroquinoline-5-carbonyl.

Other suitable groups are reactive groups of the aliphatic series, such as acryloyl, mono-, di- or trichloroacryloyl, such as —CO—CH=CH—Cl, —CO—CCl=CH$_2$, —CO—CCl=CH—CH$_3$, furthermore —CO—CCl=CH—COOH, —CO—CH=CCl—COOH,β-chloropropionyl,3-phenylsulphonylpropionyl, 3-methylsulphonylpropionyl, 2-fluoro-2-chloro-3,3-difluorocyclobutane-1-carbonyl, 2,2,3,3-tetrafluorocyclobutane-1-carbonyl or -1-sulphonyl, β-(2,2,3,3-tetrafluoro-1-cyclobutyl)-acryloyl, α- or β-bromoacryloyl, α-or β-alkyl- or -arylsulphonylacryloyl groups, such as α-or β-methylsulphonylacryloyl, chloroacetyl, vinylsulphonyl, —SO₂CH₂CH₂Z in which Z is a group detachable by alkali, in particular —OSO₃H, —OCOCH₃, Cl, Br, F, —SSO₃H, —OPO₃H₂, —OCOC₆H₅, di—C₁-C₄-alkylamino, quaternary ammonium, in particular —N⊕(C₁-C₄-alkyl)₃X⊖, —OSO₂CH₃, —SCN, —NH—SO₂CH₃, —OSO₂—C₆H₄—CH₃, —OSO₂—C₆H₅, —OCN,

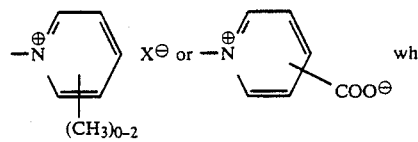

X is an anion, for example —OSO₃H, —SSO₃H, —OPO₃H₂, —Cl, —Br, —F, —SCN, —OCN, —OSO₂CH₃, —OSO₂C₆H₅, OCOCH₃, —I, —OSO₂OCH₃, —OSO₂C₆H₄CH₃, —OCOC₆H₅.

In formula (II), the following groupings have a preferred meaning:
T₁ and T₂ are Cl
X and X₁ are NH
R is H
R₁ is SO₃H
R₂ and R₃ are H
B is CH₂—CH₂—OSO₃H
W is C₂-C₄-alkyl which is substituted by OSO₃H
Z is the radical of a reactive component of the mono fluoro- or monochlorotriazine series or is 2,4-difluoro-5-chloro-6-pyrimidinyl
Y is C₂-C₄-alkylene.

In the context of the formula (2), the following dyestuffs are preferred:

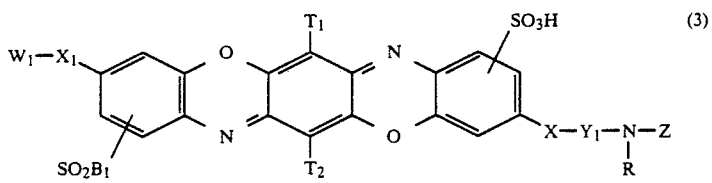

in which
T₁, T₂, R, X and Z have the meaning mentioned and B₁ is CH₂—CH₂OSO₃H
Y is an aliphatic or araliphatic radical
W₁ is an aliphatic or araliphatic radical.

Dyestuffs of the formula

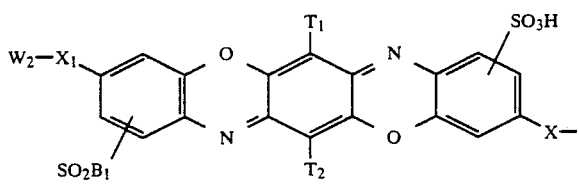

in which
T₁, T₂, R, X, Z and B₁ have the meaning mentioned and
Y₂ is an aliphatic radical
W₂ is an aliphatic radical are also preferred.

Particular preference is given to dyestuffs of the formula (4) in which

Y₂ is

—CH₂—CH₂—,

—CH₂—CH—
       |
       CH₃

—CH₂—CH₂—CH₂—CH₂—,   —CH₂—CH₂—CH₂—,

W₂ is —CH₂—CH₂—OSO₃H,

—CH₂—CH—CH₃
       |
       OSO₃H

Dyestuffs of the formulae (3) and (4) in which
T₁ and T₂ are Cl
X and X₁ are NH
R is H
Z is

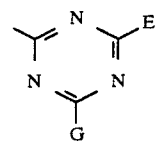

in which G is F or Cl and E denotes a substituted or unsubstituted amino group, if G is F, and denotes an ether or thioether group of the formulae —OR₅ or —SR₅, if G is Cl, where R₅ is substituted or unsubstituted C₁-C₆-alkyl or substituted or unsubstituted aryl, or is a substituted or unsubstituted amino group.

Preferred substituted or unsubstituted amino groups are those of the formula

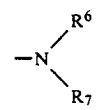

in which

R₆ is hydrogen or substituted or unsubstituted C₁-C₆-alkyl
R₇ is hydrogen or substituted or unsubstituted C₁-C₆-alkyl, C₅-C₈-cycloalkyl or substituted or unsubstituted aryl or R₆ and R₇ with the inclusion of a further heteroatom optionally form a heterocyclic ring.

Examples of substituents of alkyl radicals $R_5$, $R_6$ and $R_7$ are OH, OCH$_3$, Cl, CN, OSO$_3$H, COOH, SO$_3$H,

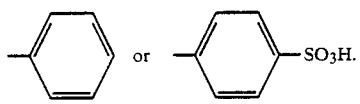

Aryl radicals $R_5$ and $R_7$ are in particular phenyl or naphthyl radicals, which can be substituted, for example, by $C_1$-$C_4$-alkyl, $C_1$-$C_4$-alkoxy, halogen such as F, Cl or Br, SO$_3$H, COOH, NHCOCH$_3$, NH$_2$.

Examples of heterocyclic groups, which are represented by

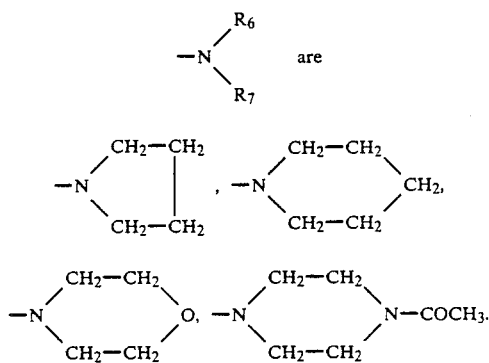

The dyestuffs according to the invention of the formula (1) cannot be prepared chemically in pure form at the present time, but are associated with the symmetrical compounds of the general formula (1a) and (1b)

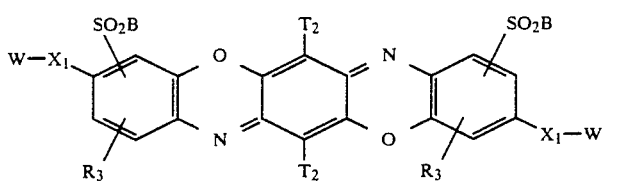

(1a)

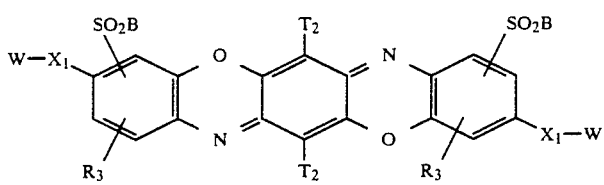

(1b)

in which the individual formula members have the meanings given in formula (I). The dyestuff-s according to the invention are formed in the synthesis as a mixture with these symmetrical dyestuffs of the formula (1a and 1b). However, these compounds of the formulae (1a and 1b) do not impair the good usability of the dyestuffs according to the invention of the formula (1), since they can also be fixed on the fibre as fibre-reactive dyestuffs. The present invention accordingly also relates to mixtures consisting of the dyestuffs of the formulae (1), (1a) and (1b), for example in a molar percentage ratio of (30 to 70) : (35 to 15) : (35 to 15), preferably in a molar ratio of (40 to 60) : (30 to 20) : (30 to 20).

The present invention also relates to processes for the preparation of the dyestuffs of the formula (I). These processes are characterized in that an amino compound of the formula (5) and an amino compound of the formula (6)

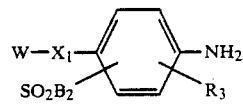

(5)

in which
W, $X_1$, $R_3$ have the meaning given in formula (1) and
$B_2$ represents B or β-hydroxyethyl,

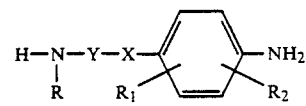

(6)

in which R, $R_1$, $R_2$, X and Y have the meaning mentioned, where substituted alkyl groups in these radicals are preferably hydroxy-substituted alkyl groups and where the benzene rings (5) and (6) in one of the o-positions relative to the primary amino group must definitely not be substituted, are reacted in a manner customary and known per se for the synthesis of triphendioxazine compounds with a benzoquinone compound of the formua (7)

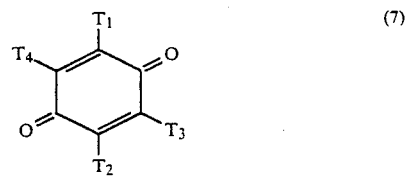

(7)

in which $T_1$ and $T_2$ have the abovementioned meanings and $T_3$ and $T_4$ are identical to or different from one another and each represents a hydrogen atom, an alkoxy group of 1 to 4 C atoms, such as, in particular, the methoxy group, or represents a phenoxy group or preferably a halogen atom, such as a bromine atom and, in particular, a chlorine atom, it also being possible for $T_3$ and $T_4$ to have the same meaning as $T_1$ and $T_2$, first to give an intermediate of the probable general formula (8)

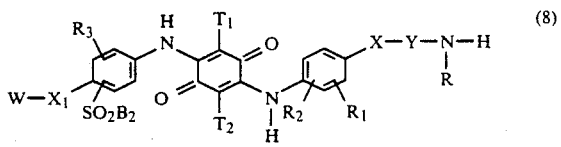

(8)

in which $B_2$, R, $R_1$, $R_2$, $R_3$, X, $X_1$, $T_1$, $T_2$, W and Y have the above-mentioned meaning, and this intermediate after isolation is cyclized, preferably in the presence of an oxidizing agent, to the triphendioxazine, during which, together with the cyclization, any hydroxyalkoyl groups present, such as, for example, the β-hydroxyethyl group of the radical $B_2$, are converted into the corresponding β-sulphatoalkyl groups by means of a sulphating agent, such as sulphuric acid containing sulphur trioxide. In this reaction, the two symmetrical chromaphores are, of course, also formed. Preferably, the two amino compounds (5) and (6) and the quinone (7) are used in approximately equimolar amounts, "approximately" meaning that the respective molar percentage can differ by up to 10%. 2,3,5,6-tetrachloro-1,4-benzoquinone (chloranil) is preferably used as the quinone of the formula (7).

The reaction according to the invention of two different amino compounds of the general formula (5) and (6) with a compound of the general formula (7) to give the anil conforming to the general formula (8) can be carried out in aqueous, aqueous-organic or in purely organic medium, where the organic solvents are preferably polar aprotic and protic solvents, such as, for example, lower alkanols, such as methanol and ethanol, or halogenated benzenes, such as o-dichlorobenzene. The reaction according to the invention of amines (5) and (6) with the quinones (7) can be carried out at a temperature between 20 and 100° C., preferably between 50 and 70° C., in the presence of an acid-binding agent, for example an alkali metal carbonate or alkaline earth metal carbonate or an alkali metal acetate or alkaline earth metal acetate, such as sodium acetate, sodium carbonate or sodium bicarbonate, or an alkali metal hydroxide or alkaline earth metal hydroxide, such as sodium hydroxide or an oxide of an alkaline earth metal, such as magnesium oxide. If the reaction is carried out in an aqueous or aqueous-organic medium, a pH range between 4 and 7, preferably between 5.5 and 6.5, is established. The anil of the formula (8) is then, preferably under oxidizing conditions and preferably after previous isolation, cyclized to the triphendioxazine compound in a manner customary and known per se. This reaction can take place, for example, in sulphuric acid or sulphuric acid containing sulphur trioxide as the medium, sulphur trioxide, ammonium or alkali metal persulphates, sodium perborate, but preferably sodium peroxydisulphate or potassium peroxydisulphate, which correspond to the formulae $Na_2S_2O_8$ or $K_2S_2O_8$), being used as oxidizing agent, or, alternatively, using oleum in the presence of iodine or an inorganic iodine compound analogously to the details of European Patent application Publication No. 0,141,359 A. Preferably, the reaction is carried out in concentrated sulphuric acid, such as 96 to, preferably, 100% strength sulphuric acid and in particular in sulphuric acid containing sulphur trioxide (oleum), such as up to 30% by weight strength oleum. The reaction temperature chosen is between 5 and 40° C., if necessary even up to 80° C., but preferably between 15 and 25° C.

If the ring closure is carried out in sulphuric acid or oleum as the reaction medium, hydroxyl groups which are bound to an alkyl radical of the molecule, such as, for example, the β-hydroxyethyl groups of the formula radical $B_2$ or the hydroxyalkyl groups of the formula radicals $R_4$ already mentioned above, W, Y and R can be converted into the corresponding sulphatoalkyl groups. If oleum is used, the reaction temperature should not exceed 30° C.

At temperatures above 25° C., sulpho groups can also be introduced according to the invention into the aromatic rings of the triphendioxazine (including the corresponding aryl radicals of $T_1$, $T_2$, W, Y, $R_3$ and $R_4$). The oleum used as reaction medium and reagent has in general a sulphur trioxide content of 5 to 30% by weight, preferably 10 to 20% by weight. Known procedures for the reaction of aromatic amines with 1,4-benzoquinones and leading to triphendioxazine compounds are described, for example, in K. Venkataraman, "The Chemistry of Synthetic Dyes", volume V, page 419 to 427 (1971), and in Ullmanns Encyclopedie der technischen Chemie (Ullmann's Encyclopaedia of Industrial Chemistry), 4th edition, volume 8, page 240 and 241 (1974) and in German Offenlegungsschrift No. 2,823,828.

The starting compounds conforming to the formula (5) are known, for example, from German Offenlegunsschriften 3,344,253, 3,404,855 and 3,439,766 and European Offenlegungsschriften 141,996 and 153,599. Compounds of the formula (5) in which $B_2$ represents β-hydroxyethyl are preferably used.

The starting compounds conforming to the formula (6) are known, for example, from German Offenlegungsschriften 2,302,382 and 2,503,611.

In order to prepare dyestuffs of the formula (1), the triphendioxazine dyestuffs of the formula (9)

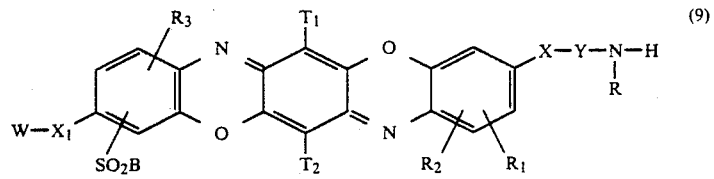

(9)

in which R, $R_1$, $R_2$, $R_3$, X, $X_1$, $T_1$, $T_2$, W and Y have the meaning mentioned, which are formed in the cyclization are condensed with a reactive component of the formula (10)

A-Z    (10)

in which Z has the meaning metnioned and A represents a substituent which is detachable as an anion (preferably halogen), with the elimination of H-A. This acylation is in general carried out in water at temperatures from 0° to 80°) C.—depending on the reactivity of (10) and in a weakly alkaline, neutral or weakly acidic medium. Preferably, an acid-binding agent, such as, for example, LiOH, $Li_2CO_3$, $Na_2CO_3$, NaOH, $K_2CO_3$, KOH, $M_gCO_3$, $CaCO_3$ and the like, is added during the condensation.

Examples of compounds of the formula (5), (6), (7) and (10) are as follows

Formula (5)

-continued

H₂N—⟨⟩—NHCH₂CH₂OH
     |
     SO₂CH₂CH₂OH

H₂N—⟨⟩—NHCH₂CH₂CH₂OH
     |
     SO₂CH₂CH₂OH

H₂N—⟨⟩—NHCH₂CHOH
     |      |
     |      CH₃
     SO₂CH₂CH₂OH

H₂N—⟨⟩—NHCH₂CH₂—⟨⟩
     |
     SO₂CH₂CH₂OH
(Sulphation of the phenyl radical upon ring closure in oleum)

H₂N—⟨⟩—NHCH₂—⟨⟩
     |
     SO₂CH₂CH₂OH
(Sulphation of the phenyl radical upon ring closure in oleum)

H₂N—⟨⟩—N(CH₂CH₂OSO₃H)₂
     |
     SO₂CH₂CH₂OH

H₂N—⟨⟩—N(CH₃)CH₂CH₂OH
     |
     SO₂CH₂CH₂OH

H₂N—⟨⟩—NHCH₂CH₂N(CH₃)CH₂CH₂OH
     |
     SO₂CH₂CH₂OH

H₂N—⟨⟩—OCH₂CH₂OH
     |
     SO₂CH₂CH₂OH

-continued

H₂N—⟨⟩—SCH₂CH₂OH
     |
     SO₂CH₂CH₂OH

H₂N—⟨⟩—NHCH₂SO₃H
     |
     SO₂CH₂CH₂OH

H₂N—⟨⟩—NH—⟨⟩—OCH₂CH₂OH
     |
     SO₂CH₂CH₂OH

H₂N—⟨⟩—NHCH₂CH₂—⟨⟩—SO₂CH₂CH₂OH
     |
     SO₂CH₂CH₂OH

Formula (6)

H₂N—⟨⟩—NHCH₂CH₂NH₂
     |
     SO₃H

H₂N—⟨⟩—NHCH₂CHCH₂NH₂
     |              |
     |              OH
     SO₃H

H₂N—⟨⟩—NHCH₂CH₂NH₂

H₂N—⟨⟩—OCH₂CH₂NH₂
     |
     SO₃H

H₂N—⟨⟩—NHCH₂CH₂NH₂
     |
     SO₂NHCH₂CH₂SO₃H

H₂N—⟨⟩—NHCH₂CH₂NH₂
     |
     SO₂NHSO₂CH₃

-continued

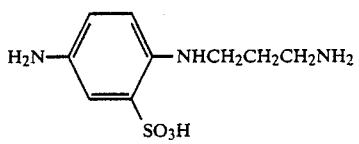
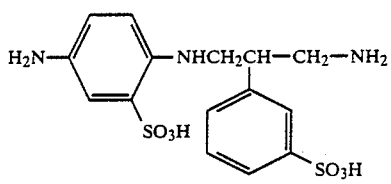
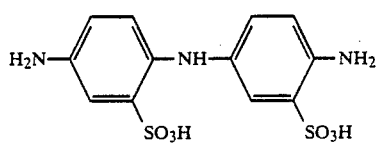
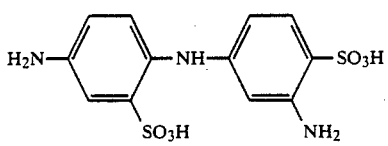
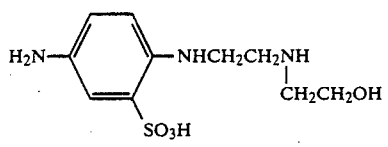

Formula (7)

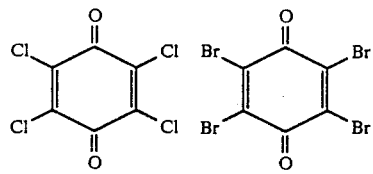
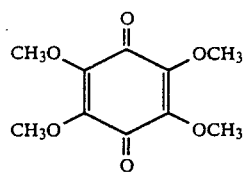
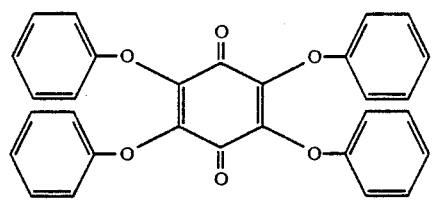

-continued

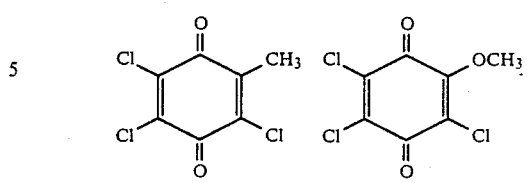

Formula (10)

Reactive components (10) are understood to mean the halides, in particular the chlorides or fluorides, of the reactive groups Z listed above.

The new dyestuffs produce clear dyeings on cellulose and natural synthetic polyamide materials. They are distinguished by high colour strength.

As water-soluble reactive dyestuffs, the new dyestuffs are preferably of interest for the dyeing of hydroxyl-and amido-containing textile materials, in particular materials made from natural and regenerated cellulose and synthetic polyamide and polyurethane fibres, wool and silk.

The materials mentioned are dyed or printed by the methods which are generally known and customary in industry for water-soluble reactive dyestuffs. They then give light-fast and wet-fast brilliant dyeings and prints.

The temperatures given in the Examples are in °C. The formulae of the water-soluble reactive dyestuffs in the description and in the Examples are those of the free acids. The dyestuffs are in general isolated and used in the form of their alkali metal salts, in particular the lithium salts, sodium salts or potassium salts.

The colour numbers given in the examples refer to the Colour Index Hue Indication Chart (Indicator Numbers).

The formula given in the examples which follow refer in each case to one of the isomeric reaction products formed in the reaction, reference being made to what has been said of the formula (1) with respect to the substituents in the two outer aromatic rings of the triphendioxazine system of the isomeric reaction product.

EXAMPLE 1 a) Preparation of the Anil Compound 23.1 g of 3-sulpho-4-(β-aminoethylamino)aniline and 26 g of 3-(β-hydroxyethylsulphonyl)-4-(β-hydroxyethylamino)aniline are stirred in 500 ml of water at 60° C. and a pH of 5.5. 26 g of chloranil are then added at a reaction temperature of about 65° C., while maintaining a pH of 5.0 to 5.5, which is maintained by dropwise addition of a dilute sodium carbonate solution. The reaction is completed at the same temperature and the pH given by stirring for four hours.

The precipitated reaction product is filtered off with suction at 60° C., washed with water and dried. After milling, a brown powder is obtained which consists of a mixture of the following three compounds, in which the unsymmetrical compound of the formula (A) predominates.

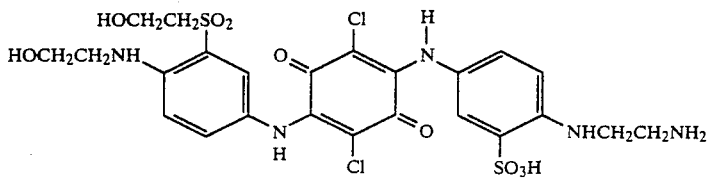
(A)

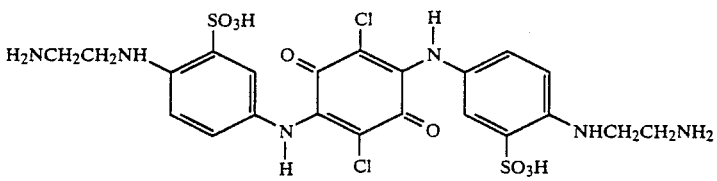
(B)

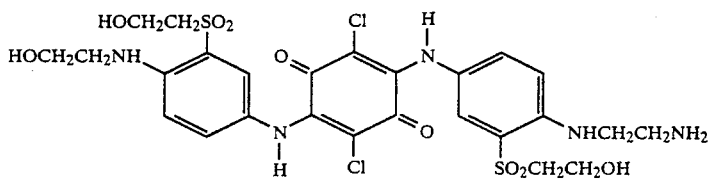
(C)

b) Cyclization to the Triphendioxazine 33.2 of the product obtained according to a) are stirred into 250 g of 10% strength oleum at a temperature of between 20 and 25° C. Stirring of the mixture is continued at this temperature for one hour. 26 g of sodium peroxodisulphate are then stirred in at such a rate that the temperature can be maintained between 20 and 25° C. Stirring is continued for 5 hours, and the mixture is then poured onto ice. Part of the condensation product is precipitated. The precipitation is completed by the addition of 10 % by volume of potassium chloride. The product is filtered off with suction, washed with KCl solution, stirred into 1 l of ice water, and the mixture is brought to a pH of 5-5.5 by pouring in sodium bicarbonate.

c) Acylation with the Reactive Component 0.05 Mole of o-sulphanilic acid are dissolved in 200 ml of ice water by means of LiOH solution under neutral conditions. At 0° C., 0.05 mole of trifluorotriazine are added dropwise, during which the pH is maintained between 6 and 7 by the addition of LiOH solution. The resulting solution, which contains the condensation product of the formula

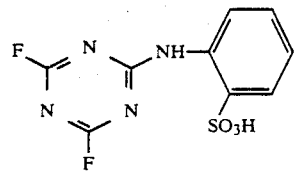

is added to the suspension of the cyclization product obtained according to b). The acylation is carried out at pH 8 and 0° C., while maintaining the pH at 8 by dropwise addition of LiOH solution. The dyestuff is dissolved during the acylation. After the condensation is completed, the solution is clarified and the dyestuff is salted out by pouring in 20% by volume of NaCl. The product is filtered off with suction, dried and milled to give a blue dyestuff powder, which dyes cotton from a long liquor in a brilliant strong blue shade (colour number 13) by a dyeing method customary for reactive dyestuffs.

The dyestuff according to the invention which is contained in the mixture corresponds to the probable formula

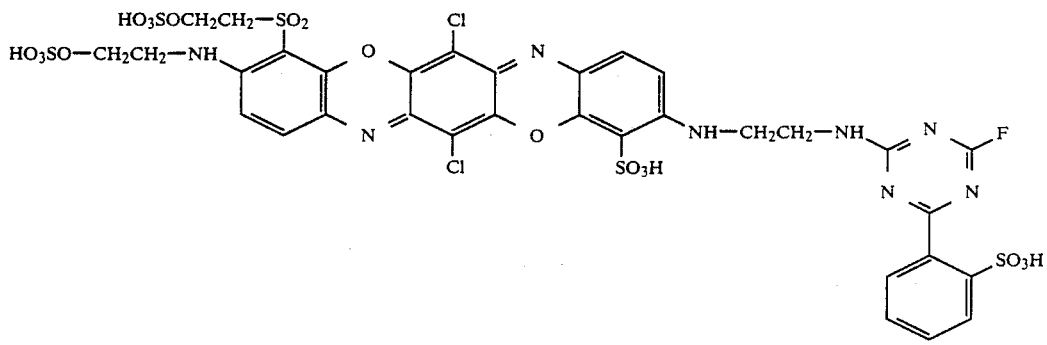

Similar dyestuffs which dye cotton in a brilliant blue shade having the colour number 13 are obtained if the corresponding amounts of the following acylating agents are used for the acylation of the aliphatic amino group of the chromophore in Example 1.

Example

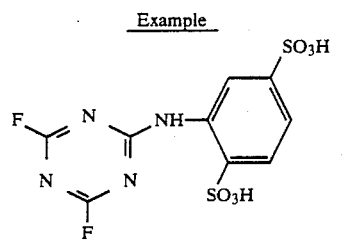

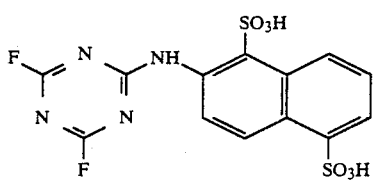

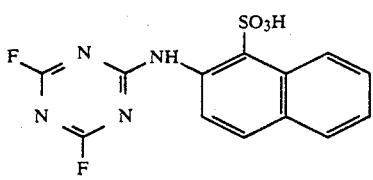

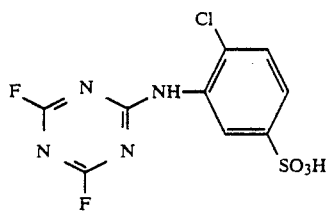

Example

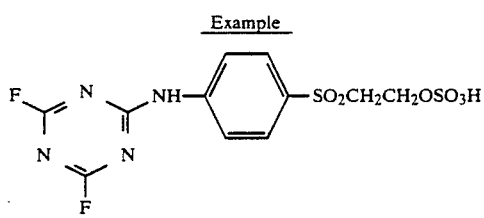

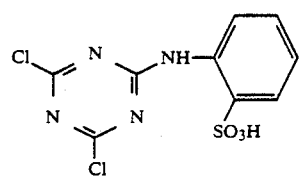

-continued
Example

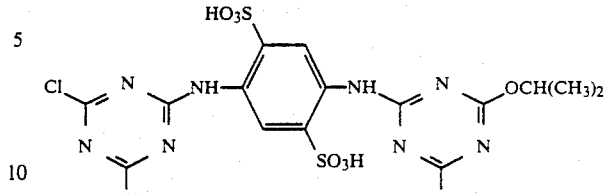

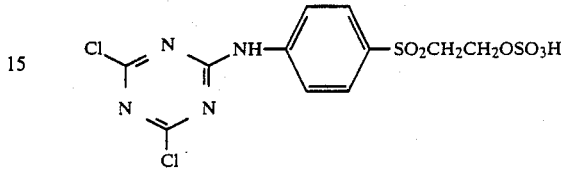

(The acylation in Examples 7, 8 and 9 is carried out at 25 to 30° C. and pH 7 to 7.5)

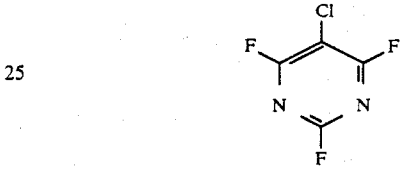

Example

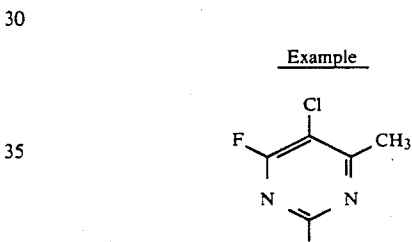

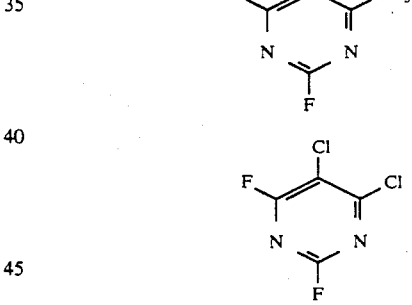

(The acylation in Example 10, 11 and 12 is carried out at 0 to 5° C. and pH 7 to 8).

Further useful dyestuffs are obtained by using the chromophores listed below instead of the chromophore according to the invention used in Example 1, the acylating agents used being the reactive components used in Examples 1 to 12.

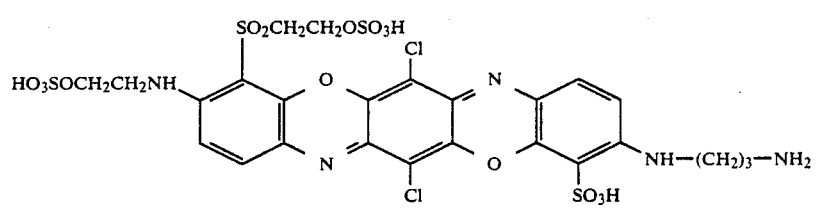

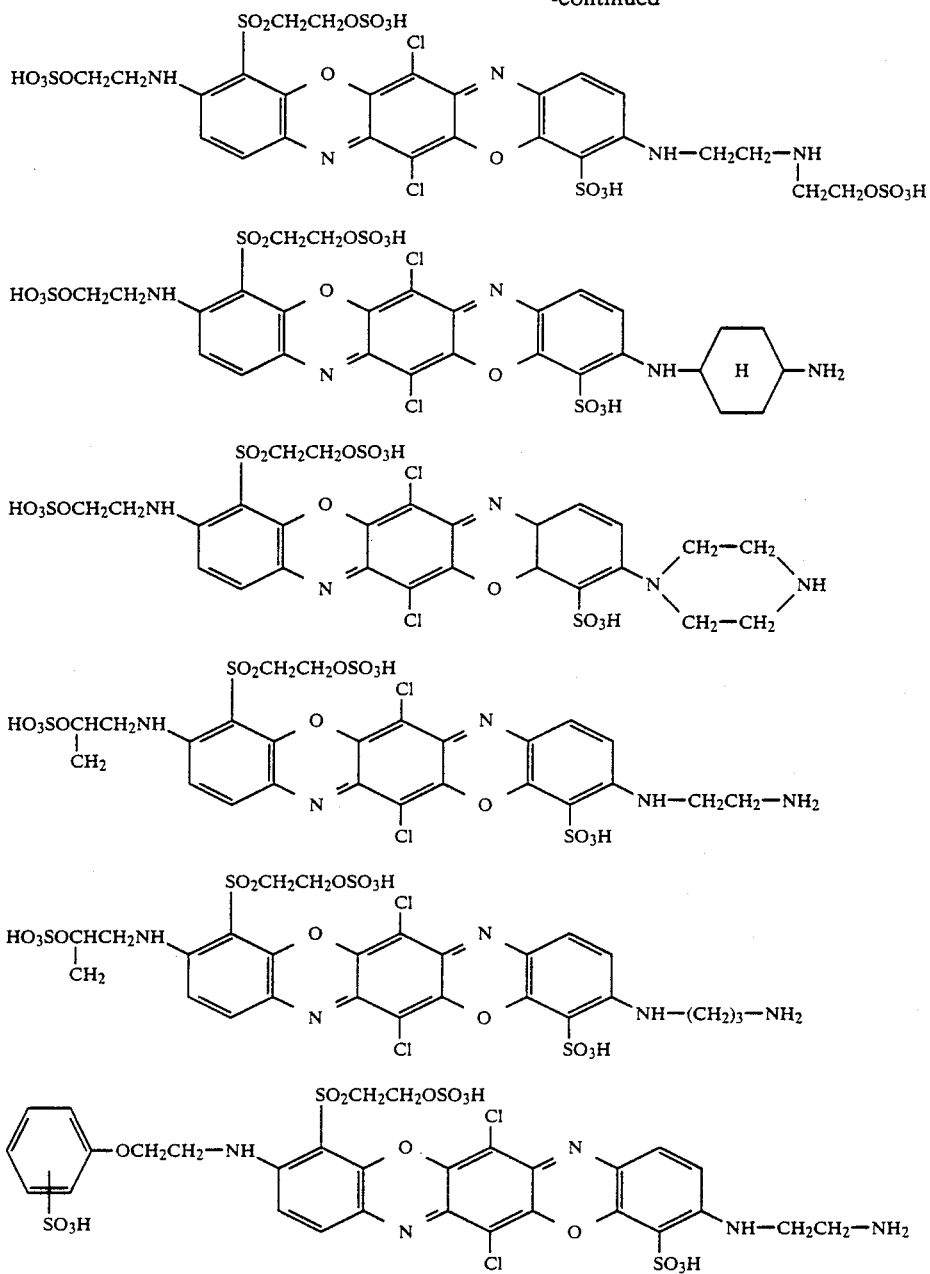

We claim:
1. Triphendioxazine dyestuffs of the formula

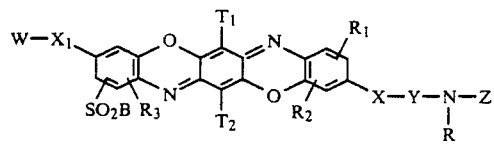

in which

B is —CH=CH$_2$ or —CH$_2$CH$_2$V

V is a detachable group selected from the group consisting of OSO$_3$H, Cl, S$_2$O$_3$H, OCOCH$_3$, OPO$_3$H$_2$, and R is H, C$_1$-C$_4$-alkyl, or C$_1$-C$_4$-alkyl which is substituted by a substituent selected from the group consisting of OH, OCH$_3$, COOH, SO$_3$H, and OSO$_3$H, Z is a fibre-reactive radical, T$_1$ and T$_2$ independently represent H, Cl, Br, C$_1$-C$_4$-alkoxy, C$_1$-C$_4$-alkyl, phenyl or phenoxy, or phenyl or phenoxy which are substituted by a substituent selected from the group consisting of Cl, CH$_3$, C$_2$H$_5$, OCH$_3$, and OC$_2$H$_5$, X and X$_1$ independently represent O, S, or NM'', R'' represents hydrogen or C$_1$-C$_4$-alkyl, or, if Y denotes a substituted or unsubstituted divalent aliphatic radical; then R'' together with R also represents alkylene, or, if W denotes an aliphatic radical, then R'' together with W also represents a ring selected from the group consisting of

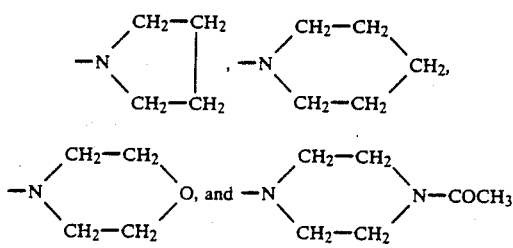

group, or is a disulphimido group $SO_2NHSO_2R_4$, or is a sulphone group $-SO_2R_4$, $R_4$ is $C_1$-$C_4$-alkyl or phenyl or $C_1$-$C_4$-alkyl or phenyl which is substituted by methyl or chlorine, and $R_2$ and $R_3$ are H, $C_1$-$C_4$-alkyl, $C_1$-$C_4$-alkoxy, carboxyl, F, Cl, or Br, the radicals $SO_2B$ and $R_1$ each being in the o-position relative to the substituents $-X_1$-W or $-X-Y-N-R-Z$.

2. Dyestuffs of claim 1 of the formula

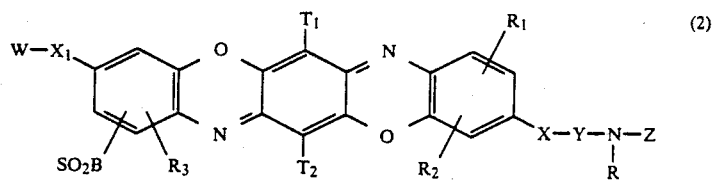

Y represents a divalent aliphatic hydrocarbyl radical, araliphatic hydrocarbyl radical, cycloaliphatic hydrocarbyl raical or aromatic hydrocarbyl radical, which is unsubstituted or substituted by a substituent selected from the group consisting of $SO_3H$, $OSO_3H$, COOH, $CH_3$, $OCH_3$ and phenyl, the aliphatic portion of the radicals being uninterrupted or interrupted by a bridging group selected from O, S, NH, N($COCH_3$), and phenylene, W represents H, a divalent aliphatic hydrocarbyl radical, araliphatic hydrocarbyl radical, cycloaliphatic hydrocarbyl radical or aromatic hydroin which
$T_1$ and $T_2$ are Cl
X and $X_1$ are NH
R is H
$R_1$ is $SO_3H$
$R_2$ and $R_3$ are H
B is $CH_2$—$CH_2$—$OSO_3H$
W is $C_2$-$C_4$-alkyl which is substituted by $OSO_3H$
Z contains a mono fluoro- or monochlorotriazine group or is 2,4-difluoro-5-chloro-6-pyrimidinyl
Y is $C_2$-$C_4$-alkylene.

3. Dyestuffs of claim 1 of the formula

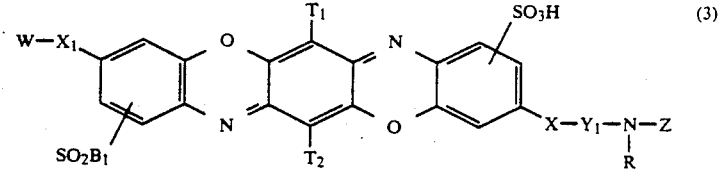

carbyl radical, which is unsubstituted or substituted by a substituent selected from the group consisting of $SO_3H$, $OSO_3H$, COOH, $CH_3$, $OCH_3$ and Cl, the aliphatic portion of the radicals being uninterrupted or interrupted by a bridging group selected from O, S, and NH, $R_1$ is a water-solubilizing group, or is a sulphomoyl group, which is unsubstituted or monosubstituted or disubstituted by $C_1$-$C_4$-alkyl, phenyl-$C_1$-$C_4$-alkyl, and phenyl, which are, in turn, further unsubstituted or substituted by a water-solubilizing in which
$B_1$ is $CH_2$—$CH_2OSO_3H$
$Y_1$ is an aliphatic hydrocarbyl or araliphatic hydrocarbyl radical
$W_1$ is an aliphatic hydrocarbyl or araliphatic hydrocarbyl radical.

4. Dyestuffs of claim 3 of the formula

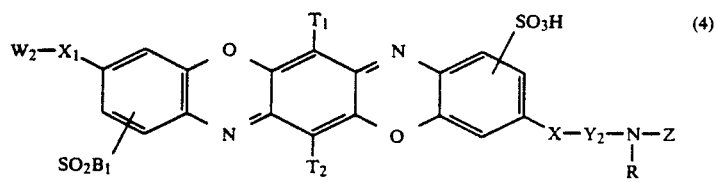

in which
$Y_2$ is an aliphatic hydrocarbyl radical
$W_2$ is an aliphatic hydrocarbyl radical.

5. Dyestuffs of claim 4 of the formula

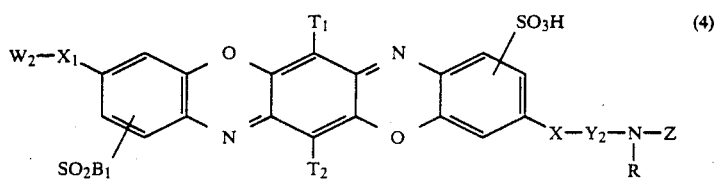

in which

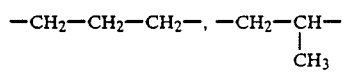

$W_2$ is $-CH_2-CH_2-OSO_3H$, $-CH_2-CH(OSO_3H)-CH_3$.

6. Dyestuffs of claim 4 of the formula

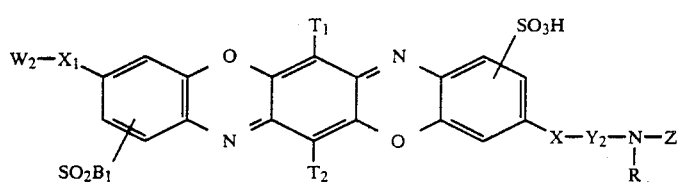

in which
$T_1$ and $T_2$ are Cl
X and $X_1$ are NH
R is H
Z is

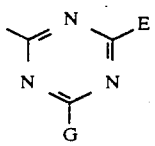

in which
G is F or Cl and
E denotes, if G is F, a substituted or unsubstituted amino group of the formula

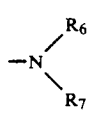

wherein
$R_6$ is hydrogen or $C_1$-$C_6$-alkyl, or $C_1$-$C_6$-alkyl substituted by a substituent selected from the group consisting of OH, $OCH_3$, Cl, CN, $OSO_3H$, COOH, $SO_3H$,

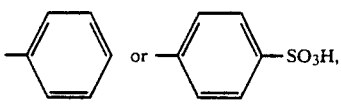

$R_7$ is hydrogen or $C_1$-$C_6$-alkyl, or $C_1$-$C_6$-alkyl substituted by a substituent selected from the group consisting of OH, $OCH_3$, Cl, CN, $OSO_3H$, COOH, $SO_3H$,

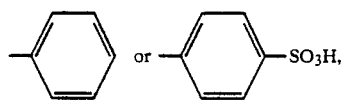

$C_5$-$C_8$-cycloalkyl or unsubstituted hydrocarbyl aryl or hydrocarbyl aryl substituted by $C_1$-$C_4$-alkyl, $C_1$-$C_4$-alkoxy, halogen $SO_3H$, COOH, $NHCOCH_3$ and $NH_2$, or $R_6$ and $R_7$ together with the nitrogen atom to which they are attached form a heterocyclic ring selected from the group consisting of

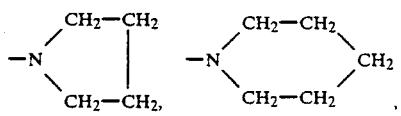

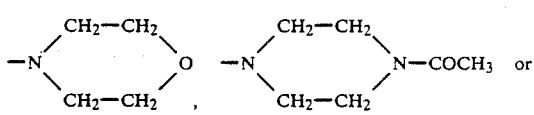

E denotes, if G is Cl, an ether or thioether group of the formulae $-OR_5$ or $-SR_5$, wherein
$R_5$ is $C_1$-$C_6$-alkyl, or $C_1$-$C_6$-alkyl substituted by a substituent selected from the group consisting of OH, $OCH_3$, Cl, Cn, $OSO_3H$, COOH, $SO_3H$,

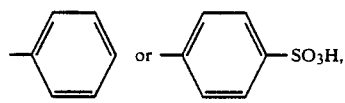

or unsubstituted hydrocarbyl aryl or hydrocarbyl aryl substituted by $C_1$-$C_4$-alkyl, $C_1$-$C_4$-alkoxy, halogen, $SO_3H$, COOH, $NHCOCH_3$ and $NH_2$, or a substituted or unsubstituted amino group of the formula

wherein

R$_6$ is hydrogen or C$_1$–C$_6$-alkyl, or C$_1$–C$_6$-alkyl substituted by a substituent selected from the group consisting of OH, OCH$_3$, Cl, CN, OSO$_3$H, COOH, SO$_3$H,

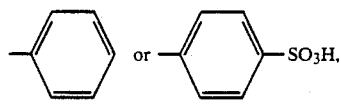

R$_7$ is hydrogen or C$_1$–C$_6$-alkyl, or C$_1$–C$_6$-alkyl substituted by a substituent selected from the group consisting of OH, OCH$_3$, Cl, CN, OSO$_3$H, COOH, SO$_3$H,

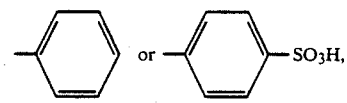

C$_5$–C$_8$-cycloalkyl or unsubstituted hydrocarbyl aryl or hydrocarbyl aryl substituted by C$_1$–C$_4$-alkyl, C$_1$–C$_4$-alkoxy, halogen, SO$_3$H, COOH, NHCOCH$_3$ and NH$_2$, or R$_6$ and R$_7$ together with the nitrogen atom to which they are attached form a heterocyclic ring selected from the group consisting of

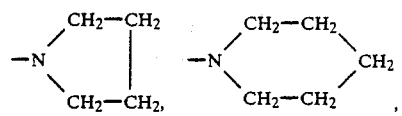

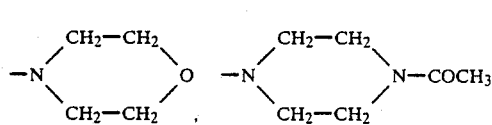

7. Dyestuff of claim 6 of the formula

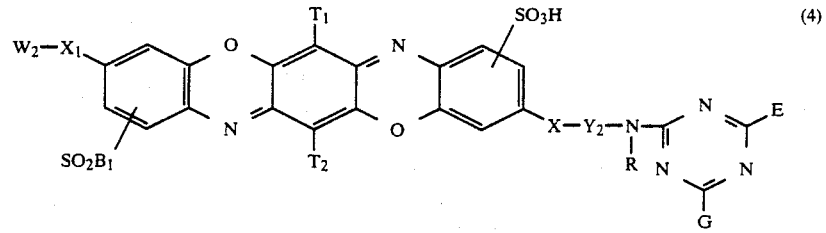  (4)

in which G is F.

* * * * *

UNITED STATES PATENT AND TRADEMARK OFFICE
CERTIFICATE OF CORRECTION

PATENT NO.  : 5,057,609

DATED       : October 15, 1991

INVENTOR(S) : Jager et al.

It is certified that error appears in the above-identified patent and that said Letters Patent is hereby corrected as shown below:

Col. 1, line 15      Delete " SO₂and " and substitute -- SO₂B and --

Col. 9, line 51      Delete " Y " and substitute -- Y₁ --

Col. 21, lines 5-50  Delete " Example

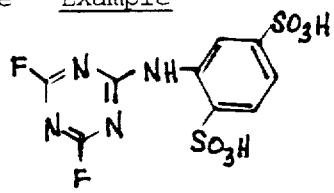

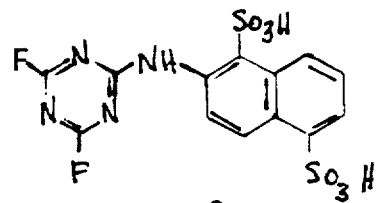

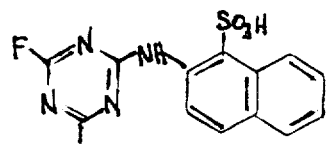

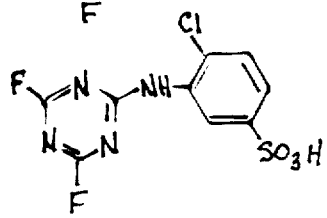

UNITED STATES PATENT AND TRADEMARK OFFICE
CERTIFICATE OF CORRECTION

PATENT NO. : 5,057,609

DATED : October 15, 1991

INVENTOR(S) : Jager et al.

It is certified that error appears in the above-identified patent and that said Letters Patent is hereby corrected as shown below:

Col. 21, lines 5-50 Continued "

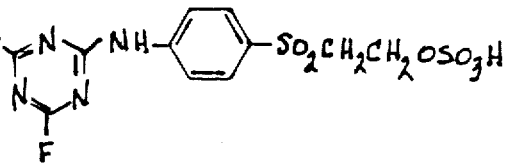

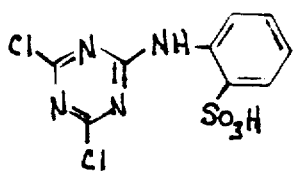

" and substitute

-- Example

2.

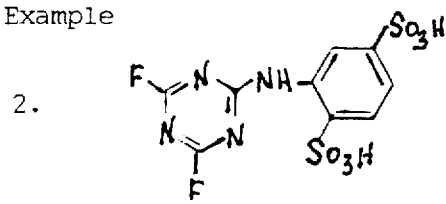

3.

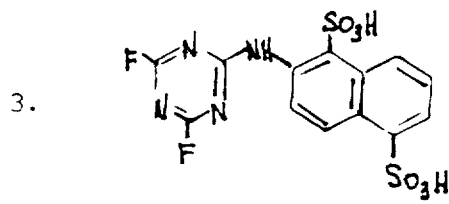

4.

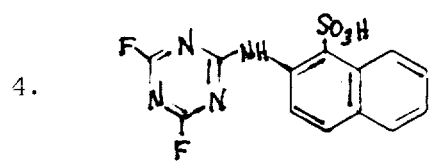

UNITED STATES PATENT AND TRADEMARK OFFICE
CERTIFICATE OF CORRECTION

PATENT NO. : 5,057,609

DATED : October 15, 1991

INVENTOR(S) : Jager et al.

It is certified that error appears in the above-identified patent and that said Letters Patent is hereby corrected as shown below:

Col. 21, lines 5-50    Continued --

5. 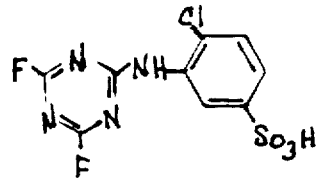

6. 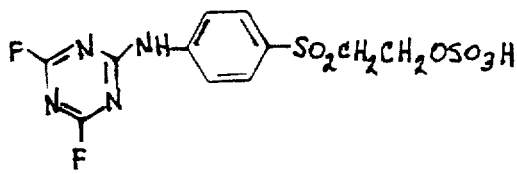

7. 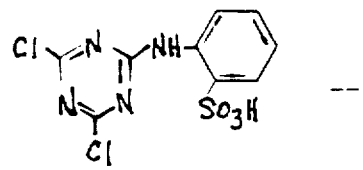

Col. 22, lines 8-45    Delete " 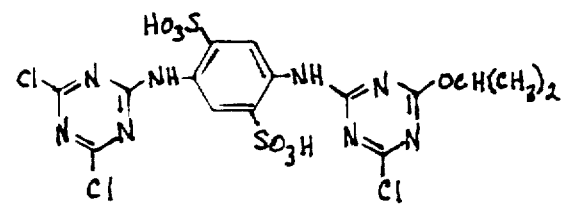

UNITED STATES PATENT AND TRADEMARK OFFICE
CERTIFICATE OF CORRECTION

PATENT NO. : 5,057,609
DATED : October 15, 1991
INVENTOR(S) : Jager et al.

It is certified that error appears in the above-identified patent and that said Letters Patent is hereby corrected as shown below:

Col. 22, lines 8-45    Continued " 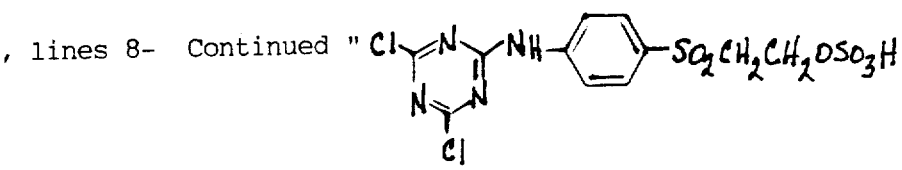

(The acylation in Examples 7,8 and 9 is carried out at 25 to 30°C. and pH 7 to 7.5)

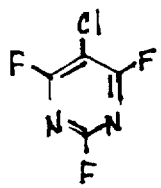

Example

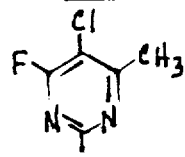

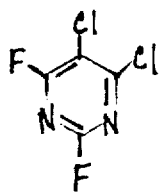   " and substitute

UNITED STATES PATENT AND TRADEMARK OFFICE
CERTIFICATE OF CORRECTION

PATENT NO. : 5,057,609

DATED : October 15, 1991

INVENTOR(S) : Jager et al.

It is certified that error appears in the above-identified patent and that said Letters Patent is hereby corrected as shown below:

Col. 22, lines 8-45

Continued

-- Example

8. 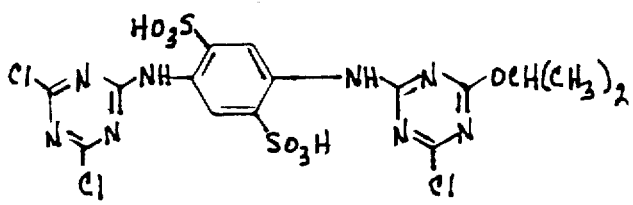

9. 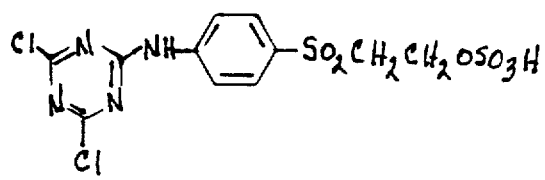

(The acylation in Examples 7, 8 and 9 is carried out at 25 to 30°C and pH 7 to 7.5)

10. 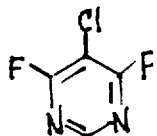

11. 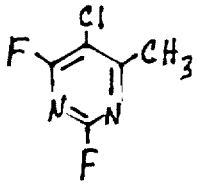

UNITED STATES PATENT AND TRADEMARK OFFICE
CERTIFICATE OF CORRECTION

PATENT NO. : 5,057,609

DATED : October 15, 1991

INVENTOR(S) : Jager et al.

It is certified that error appears in the above-identified patent and that said Letters Patent is hereby corrected as shown below:

Col. 22, lines 8-45    Continued

-- Example 12. 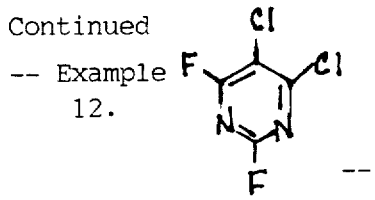 --

Col. 24, line 62    Delete " NM " and substitute -- NR --

Col. 25, line 26    Delete " raical " and substitute -- radical --

Col. 26, lines 8-9    Delete " -X-Y-N-R-Z " and substitute -- -X-Y-N-Z --
$$\phantom{xxxxxxxxxxxxxxxxxxxxxxxxxxxxxxxxxxxxxxxxxxxxxxxxxxxxxxxxx}\underset{R}{|}$$

Col. 26, line 40    Delete " 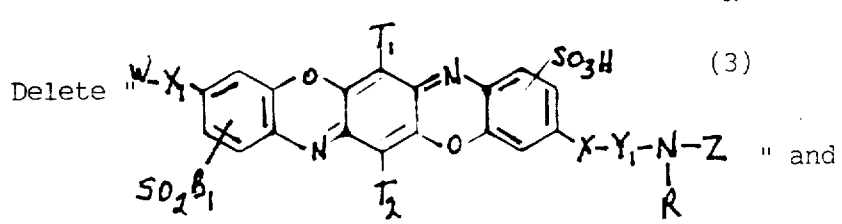 " and substitute -- 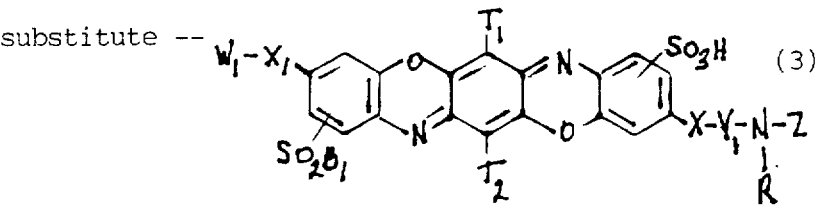 --

UNITED STATES PATENT AND TRADEMARK OFFICE
CERTIFICATE OF CORRECTION

PATENT NO. : 5,057,609
DATED : October 15, 1991
INVENTOR(S) : Jager et al.

It is certified that error appears in the above-identified patent and that said Letters Patent is hereby corrected as shown below:

Col. 28, line 50   Delete " Cn " and substitute -- CN --

Signed and Sealed this

Twenty-first Day of December, 1993

Attest:

BRUCE LEHMAN

*Attesting Officer*   *Commissioner of Patents and Trademarks*